A. STORM.
GAGE.
APPLICATION FILED SEPT. 10, 1918.

1,368,072.

Patented Feb. 8, 1921.

Witness

Inventor
A. Storm
By C. A. Snow & Co.
Attorneys

UNITED STATES PATENT OFFICE.

ADOLPH STORM, OF THOMPSON, IOWA, ASSIGNOR OF ONE-HALF TO OSCAR W. NELSON, OF THOMPSON, IOWA.

GAGE.

1,368,072.

Specification of Letters Patent.

Patented Feb. 8, 1921.

Application filed September 10, 1918. Serial No. 253,436.

*To all whom it may concern:*

Be it known that I, ADOLPH STORM, a citizen of the United States, residing at Thompson, in the county of Winnebago and State of Iowa, have invented a new and useful Gage, of which the following is a specification.

This invention relates to a combined reamer jig and testing gage primarily designed for use in gaging and correcting connecting rods of engines, one of the objects of the invention being to provide a simple and compact structure by means of which the rod can be tested for straightness and for twist and whereby, after any defects of this nature have been located and corrected, the bearing in the rod can be reamed quickly and accurately to give a round, smooth bearing of perfect fit, thus insuring accurate assembly and operation of the parts without the necessity of taking apart and reshaping the parts several times as has usually been the case where guesswork has been resorted to in straightening and fitting the rod.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1:
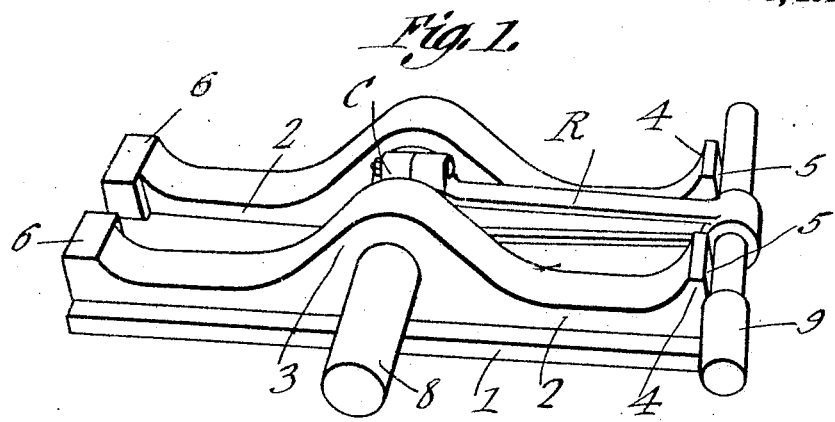
Figure 1 is a perspective view of the gage, a connecting rod being shown in position therein to be tested for alinement.
Figure 2:
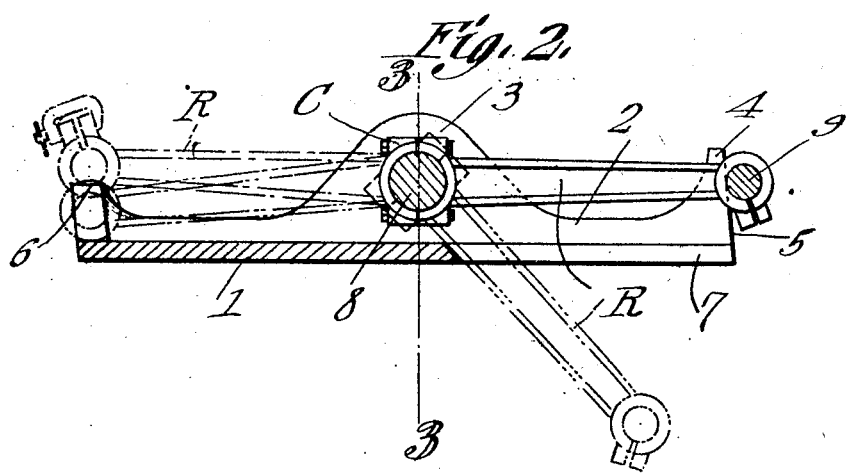
Fig. 2 is a central longitudinal section through the gage, the rod being shown, by dotted lines, in three positions, for testing twist, for testing straightness, and for tightening the bearing cap.
Figure 3:
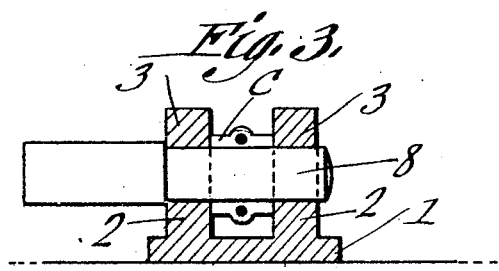
Fig. 3 is a section on line 3—3, Fig. 2.
Figure 4:
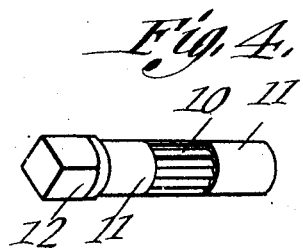
Fig. 4 is a perspective view of the reamer to be used with the gage.

Referring to the figures by characters of reference, 1 designates a base plate adapted to be attached to a support in any manner desired and having upstanding side flanges 2 provided with central bearings 3. The ribs are provided at one end with upstanding lugs 4 and the outer or end faces of the lugs are inclined upwardly and inwardly as shown at 5 to constitute gage surfaces for use in gaging alinement. Rests 6 are formed at the other ends of the flanges 2 and are equal in height, these rests being used in testing for twist. The base 1 is cut away between the ribs 2 to form a slot 7 which extends between the lugs 4 and inwardly toward the center of the base.

When it is desired to test a connecting rod R for straightness of its longitudinal axis an arbor 8 is inserted through the bearings 3 and also through the bearing of the rod R. Said rod is then swung to position between the rests 6 and, if straight, will enter freely therebetween. To test for twists, an arbor 9 is inserted through the eye in the end of the rod R and caused to bear on the rests 6. Should it only contact with one of the rests it would indicate that the rod is twisted and would also show the amount of correction necessary. Alinement of the rod whereby the axis of the arbors 8 and 9 are parallel can be gaged by swinging the rod between the lugs 4 and allowing the arbor 9 to engage the inclined faces or planes 5.

By providing the inclined faces 5 the arbor will rest upon one or both faces of the lugs. If the rod is slightly bent the arbor will only rest on one of the inclined faces 5. As the faces are inclined the user can readily sight along the faces while the arbor is in position, thereby to determine to what extent the rod has been bent, and the amount of bending necessary to straighten the rod. As the faces 5 are inclined they can be used in gaging rods which vary in length.

The bearing of the rod can be reamed by removing the cap C of the bearing and filing off a small thickness thereof. A reamer 10 having cylindrical bearing portions 11 at the ends thereof and a square head 12 is inserted in the bearings 3 in lieu of the arbor 8, the rod R is suspended between the rests 6 and against the reamer, and the cap is adjusted tightly against the reamer and secured to the rod. By then giving the reamer a turn with a wrench or the like, the bearing in the rod will be quickly and accurately rounded and smoothed. Thus, in about one tenth the time ordinarily required to scrape and fit a connecting rod, a rod can be properly reamed and straightened by means of the present device and can be put in place and used without the necessity of again removing it to make further changes.

What is claimed is:—

1. A device of the class described including a base, spaced upstanding lugs at one end of the base and having outer downwardly inclined faces forming an alinement gage, spaced rests at the other end of the base, central bearings at the sides of the base between the lugs and rests, and means detachably mounted within the bearings for insertion into the bearing in one end portion of a connecting rod.

2. A device of the character described including a base, central bearings at the sides thereof, a member insertible into the bearings and through the bearing in one end of a connecting rod, lugs at one end of the base and spaced apart to receive between them one end portion of the connecting rod supported between the bearings, said lugs having outwardly and downwardly inclined gage faces, an arbor insertible through the rod for engagement with said faces, and rests at the other end of the base and spaced apart to receive the end of the rod therebetween, said rests constituting twist gages for engagement by said arbor while inserted in the rod.

3. A device of the character described including a base having central side bearings, a detachable member insertible into the bearings to support between the bearings one end of a connecting rod, lugs at one end of the base and having downwardly and outwardly inclined gage faces, said lugs being spaced apart to receive one end portion of the rod therebetween, spaced rests at the other end of the base and forming a twist gage, and an arbor insertible into the other end of said connecting rod and movable therewith to position upon the lugs and the inclined faces of the rests.

4. A device of the character described including a base having central side bearings, a member having bearing portions mounted in the bearings and a portion between the bearings, said member constituting a support for one end of a connecting rod, lugs upstanding from one end of the base and having outwardly and downwardly inclined gage faces, rests upstanding from the other end of the base and forming twist gage members, an arbor insertible into the other end of said connecting rod and movable against the lugs and rests, there being a slot in the base between the lugs for the reception of the connecting rod.

In testimony that I claim the foregoing as my own, I have hereto affixed my signature in the presence of two witnesses.

ADOLPH STORM.

Witnesses:
V. H. DAY,
LEROY OSBRINK.